June 9, 1936. E. MÜLLER 2,043,486

FREEWHEEL MECHANISM AND BACK PEDAL BRAKE

Filed Dec. 5, 1932 3 Sheets—Sheet 1

The Inventor
Erich Müller

June 9, 1936. E. MÜLLER 2,043,486
FREEWHEEL MECHANISM AND BACK PEDAL BRAKE
Filed Dec. 5, 1932 3 Sheets-Sheet 2
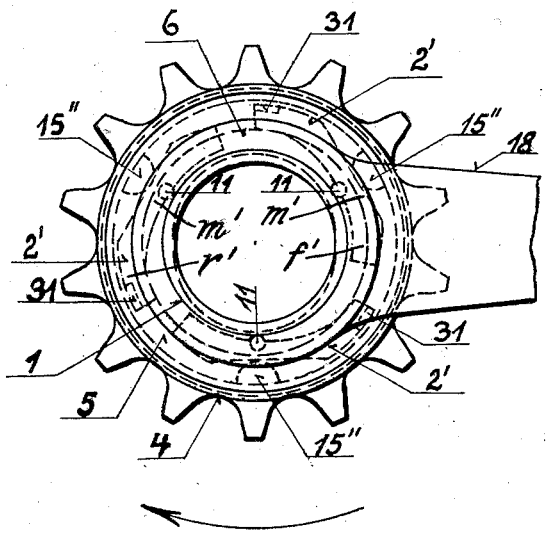
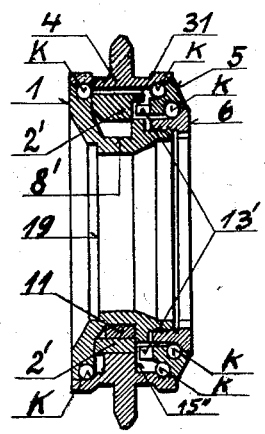
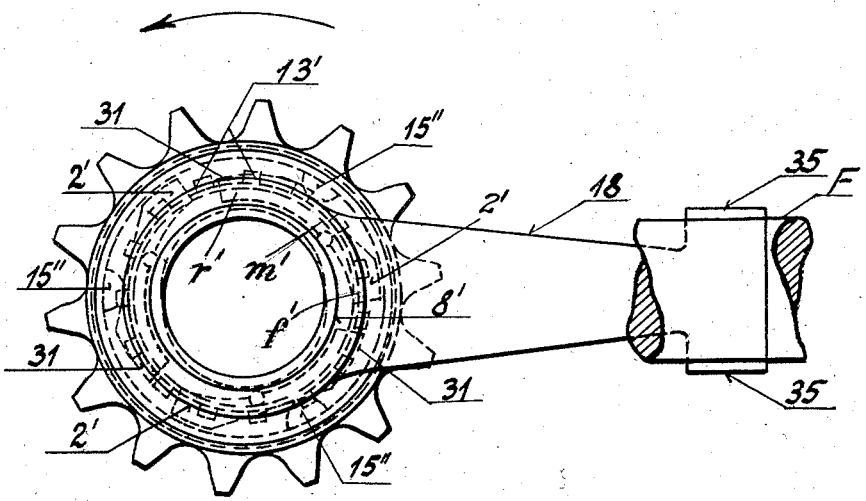
The Inventor

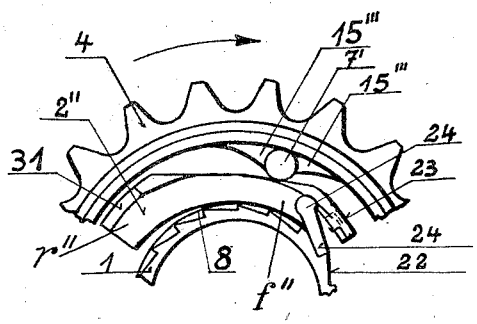
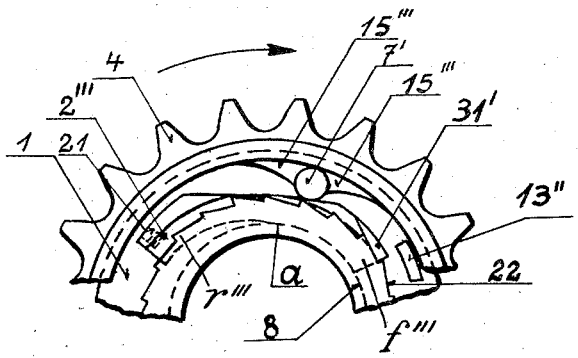
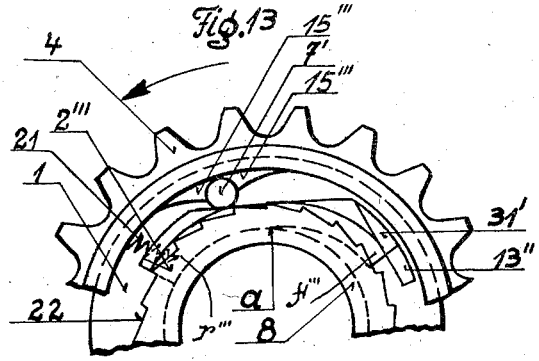

Patented June 9, 1936

2,043,486

UNITED STATES PATENT OFFICE 2,043,486

FREEWHEEL MECHANISM AND BACK PEDAL BRAKE

Erich Müller, Berlin-Spandau, Germany

Application December 5, 1932, Serial No. 645,782
In Germany January 10, 1931

18 Claims. (Cl. 192—6)

The present invention relates to a free-wheel mechanism with back pedalling brake for bicycles and motor vehicles, and has for its main object to provide a self-contained mechanism for this purpose which will be certain and satisfactory in operation.

Another very important object of the invention is to provide in a mechanism of the type referred to independent braking and clutching means freely mounted between the driving wheel and a braking surface on the driven wheel, and wherein control cams are provided on the driving wheel itself which act directly upon said braking or clutching means and which are adapted to act either upon said clutching means to produce a driving connection between the driving wheel and the driven wheel or upon said braking means to produce a braking action.

A further object of the invention is to provide a mechanism of the type referred to which consists of a small number of parts so arranged relatively to each other that wearing of the same is greatly reduced.

A further object of the invention is to provide on the braking drum an oval recess adapted to receive an accordingly shaped portion of the hub of the driven wheel, thus obtaining a braking drum of great strength due to the absence of threads on the drum which were necessary in prior devices for connecting the drum to the driven member.

Still another object is to provide in a ring having a wedge-like shaped annular groove an oval recess of the type referred to and to make provisions permitting lubrication of the braking surface constituted by the side faces of said wedge-like annular groove.

Another object of the invention is to provide a modification of a mechanism of the type referred to wherein the braking and clutching actions are produced relatively by a single member adapted to be operated upon directly by said control cams on the driving wheel.

A further object is to provide in a device of the type referred to latching means for said freely mounted braking and clutching means, said latching means constituting an abutment for said single members upon braking.

Still another object is to provide latching means becoming active in the driving operation.

The braking and clutching means mentioned above may rest upon special supports which only permit engagement of the braking drum by the braking and clutching means under the control of the controlling cams, if this is required; or the braking and clutching means may normally engage the braking drum and said engagement may be increased under the control of the controlling cams so as to cause a coupling action.

Still another object is to provide a device of the type referred to wherein said control cams are acting upon the cam controlled means through curved members shaped to obtain a life time of the device exceeding the life time of the other parts of the vehicle which are subjected to wearing, and still a further object is to obtain the purpose just referred to by the assistance of rolling means.

The accompanying drawings illustrate various embodiments of the invention.

Fig. 8 shows a side view of an embodiment wherein the same means act as braking or clutching means, said means being shown in driving position.

Fig. 9 is an axial section through the mechanism shown in Fig. 8.

Fig. 10 shows the mechanism according to Fig. 8 in braking position.

Fig. 11 shows an embodiment in which the clutching means are latched to the braking surface during driving operation, a resilient latch being provided for said purpose.

Fig. 12 shows a similar embodiment in driving position in which embodiment the same projections of the braking and clutching means are latched to the braking drum during driving action and to the clutching ring during braking action.

Fig. 13 shows the mechanism according to Fig. 12 in braking position.

Figure 4:
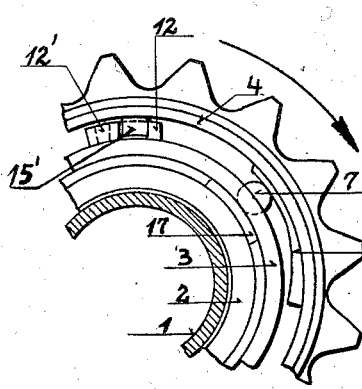
Fig. 4 shows a side view of the mechanism in driving position.

As is shown in Figs. 1, 2 and 4 to 6 the chain wheel 4 is provided inwardly with lugs 15, 15' for controlling the braking and clutching elements 2 and 3 respectively. Facing said lugs and concentrically to the aforesaid chain-wheel is provided on the main piece 1 of the free-wheel device the brake-surface 8 comprising a cylindrical mid portion and two laterally wedge portions of conical shape, extending from the said cylindrical mid portion towards the surrounding chain-wheel. The braking-surface is shaped in a similar manner in each of the embodiments of the invention shown in the accompanying drawings; of course, the invention is not restricted to the particular combination of cylindrical and wedge portions on the aforesaid means. According to the invention between the braking surface shaped in any suitable manner and the aforesaid chain-wheel are loosely provided the abovesaid braking elements 2. The said members 2 are supported on their side adjacent to the braking surface and are shaped to fit with this surface. The embodiment of the invention which is shown in Figs. 1 to 7 provides separate clutching and braking members 3 and 2 respectively for clutching the main-piece to the chain-wheel when the chain wheel is operated for forward drive, and for braking the vehicle by engaging the braking surface on the main-piece when the chain-wheel is operated rearwardly. The brake-surface 8 is embraced by a resilient steel ring 30 adapted to support the braking elements 2; said braking elements being recessed on their side adjacent the brake-surface to fit with the aforesaid resilient steel ring. This recess on the braking elements 2 is indicated at 10.

In this instance all parts are controlled by the cams by means of curves; in connection with the clutching means, a curve is used running at the point of operative engagement at a right angle to the direction of the acting force, thereby preventing engagement beyond said point, while in connection with the braking means the curve extends beyond the point of operative engagement for an amount practically excluding any sliding of the part engaging said curved guide path. In order to obtain said result with a small amount of extension, in the illustrated embodiment a rolling means is provided for in connection with each of the last mentioned curves immediately engaging on the latter as will be described right below.

The lugs 15 controlling the braking elements 2 are curved in connection with the embodiment of the invention shown in the abovesaid Figs. 1 to 7, and there are rollers 7 provided between the said lugs and the last-mentioned braking elements. Openings 14 adapted to embrace the said rollers 7 in a cage-like manner are provided in the clutching element 3 which is arranged to embrace the braking elements as a whole. Saw-like teeth 9 are provided on one edge of the said clutching element 3. Opposite the said teeth 9 is provided on the main piece 1 a set of teeth 9' adapted to engage the teeth 9. On the back of the clutching elements 3 are arranged sets of lugs 12, 12' constituting a curved guide path. Lugs 15' of special shape are provided on the inner side of the chain-wheel 4 to engage into said path between the lugs 12, 12' of each set. The said lugs 15' are adapted to control the clutching element 3 depending upon the operation of the chain-wheel.

The above-mentioned main piece 1 which provides the brake-surface 8 is provided with an oval recess 19 on one end adjacent to the hub of the wheel. This oval recess 19 is adapted to fit into the adjacent end of the hub which must be shaped accordingly. A flanged ring 6 is screwed into or connected in any suitable manner to the other end of the main piece to hold all parts of the device in position. Between the chain-wheel and the main piece and between the chain-wheel and the detent ring 5 as well as between the said detent ring and the chain-wheel are ball-bearings K arranged.

Figure 1:
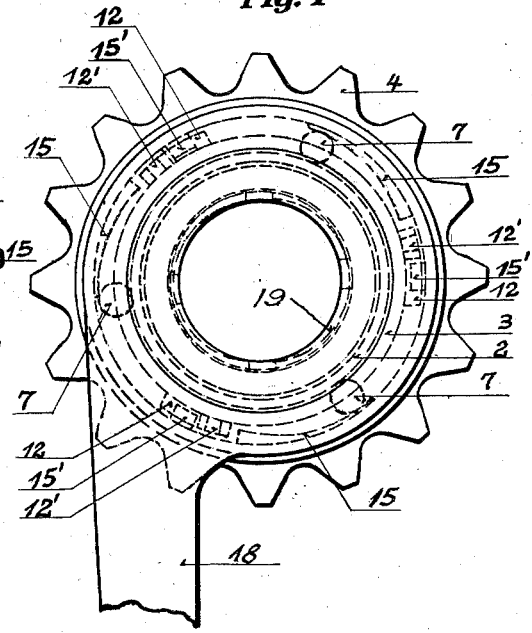
Fig. 1 shows a front view of an embodiment including separate braking and clutching means and differently shaped controlling cams; rolling means are inserted between the braking means and the coordinated cams.
Figure 2:
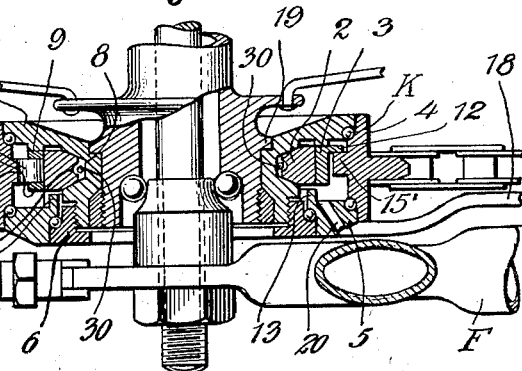
Fig. 2 shows an axial section through the mechanism illustrated in Fig. 1, said mechanism being shown in position on the respective portion of a vehicle.
Figure 3:
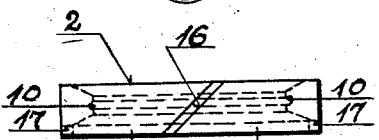
Fig. 3 shows merely the braking means of the aforesaid embodiment in front view; the space between two braking elements may be seen.

A lever 18 shown in Figs. 2 and 10 is connected on one end to the frame F of the vehicle by means of a brace 35 as shown in Fig. 10. As is shown in Figs. 1 and 2 the other end of said lever is rigidly connected to the detent ring 5 which is arranged within the free-wheel device to constitute an abutment for the back-pedal brake. In Fig. 1 the frame embraced by the aforesaid brace 35 as well as the adjacent end of the lever 18 are not shown, while in Fig. 2 fragments of the frame F and of the lever 2 are shown without the brace 35. The said detent ring 5 is provided with projections 13; there are also lugs 31 provided on the braking elements 2. The last mentioned lugs 31 are adapted to move in and out between the aforesaid projections 13 provided on the detent ring 5, there abutting, on one end of the said projections when the brake is operated. There are provided on the entire braking elements 2 but two lugs 31 of large extent leaving only small spaces 17 between each other, projections 13 shaped to fit with the aforesaid spaces 17 on the detent ring 5 being in steady engagement with the last-mentioned spaces 17. To prevent rollers 7 from being stopped by the ends of the braking elements 2, the said elements 2 are obliquely shaped on their ends as shown in Fig. 3.

Figure 5:
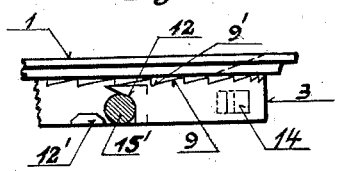
Fig. 5 shows a front view of the clutching means for free wheel when said means are in driving engagement; the cams are shown in section.

Due to the rotation of the chain-wheel in a clockwise direction (as shown by the arrow in Fig. 4) the vehicle will be driven since the chain-wheel will be clutched to the central main-piece. The cams 15' (Fig. 7) will enter the curved path defined by the pairs of lugs 12, 12' provided on the above-mentioned clutching element 3. This element being at first out of motion will be moved axially by the cams 15' engaging the said pairs of lugs 12, 12', the teeth 9 provided on one edge of the clutching element 3 thereby engaging the teeth 9' provided on the central main piece 1, as is shown in Fig. 5. When the chain-wheel 4 is further rotated the cams 15' are in steady engagement with the lugs 12, thus keeping the straight flanks of the teeth 9, 9' in engagement and turning with the chain-wheel the central main piece 1 as well as the hub of the wheel the end of which is rigidly embraced by the above-mentioned oval recess 19 provided on the central main-piece.

Figure 7:
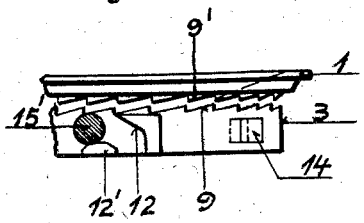
Fig. 7 shows the clutching means according to Fig. 5 if they are open during free wheel or braking action.

When free-wheel is practiced the clutching element 3 leaves behind it the cams 15'. The curved rear lugs 12' provided on the clutching ring 3 will then engage their respective cams 15', thus braking the clutching element 3 and moving it axially to disengage the teeth 9, 9' from one another. Being braked by the lugs 12' engaging the cams 15', the element 3 is left behind the central main piece 1 which continues to rotate together with the wheel. In connection therewith the oblique flanks of the said teeth 9, 9' tend to move the element 3 axially to disengage entirely the said teeth as shown in Fig. 7 and to disconnect the chain-wheel from the central main piece 1.

Figure 6:
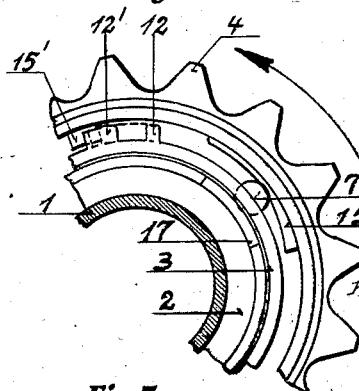
Fig. 6 shows a front view of the same mechanism, however, during braking action.

When the chain-wheel 4 is turned back for braking as indicated by the arrow in Fig. 6 the cams 15 will become operative instead of the cams 15'. By their curved shape they are adapted to press upon the rollers 7 which under the influence of said cams 15 will press upon the braking elements 2 to bring the same into frictional engagement with the brake surface thus effecting a braking action. Before said action of the cams 15 takes place, the rollers 7 are free to move on the backs of the braking elements over any space. If they are just above one of the before mentioned recesses 17 on the said braking elements, on each braking member there is space enough adjacent the said recesses 17 to give support to any one of the rollers 7. The abutments 13 on the detent-ring 5 can be left in steady engagement with the recesses 17 on the braking elements 2 but it must be noted that the edges of the first-mentioned lugs should never pass over the outer circumference of the braking elements 2.

Another preferred embodiment of the invention is shown in Figs. 8 to 10; in said embodiment there is also arranged a chain-wheel 4 provided inwardly with lugs for controlling the braking and clutching means while concentrically to said chain wheel there is provided the central main piece 1 comprising the brake-surface 8'. By way of example only one wedge shaped surface is shown adjacent the cylindrical mid portion of the said brake-surface 8'; the surface opposite the said wedge surface is provided in a straightly radial plane of the main piece 1. The braking elements 2' in this embodiment of the invention are provided to act both as braking and as clutching elements. They are adapted to tilt loosely, and in the embodiment shown in the said Figs. 8 to 10 they are supported on the cylindrical mid portion of the braking surface 8' by means of rollers 11 provided between the brake surface and the said braking and clutching elements 2'. When the chain-wheel is operated to rotate in any direction, the said braking and clutching elements 2' will tilt on their supports to engage the brake-surface with one of their end portions. The cams 15" provided on the inner side of the chain-wheel are shaped to cooperate with the outer side of the braking and clutching elements 2' provision being made for direct engagement between the aforesaid elements.

On the detent-ring 5 anchored to the frame F of the vehicle by means of a lever 18 and a brace 35 just as described in connection with Fig. 2 and as particularly shown by Fig. 10 a greater number of abutments 13' is provided in connection with the present embodiment of the invention than in the abovesaid embodiment shown in Figs. 1 to 7, each braking and clutching element being provided with one lug 31 arranged on the rear end of each of the said elements 2'.

An oval shaped recess 19 on the main piece 1 adapted to fit into the adjacent end of the hub which must be shaped accordingly, and a flanged ring 6 screwed on to the other end of the said main piece to hold all parts of the device in position are arranged in a manner just similar to that described in connection with the above described embodiment of the invention.

Due to the rotation of the chain-wheel in a clockwise direction the lugs 15" will press upon the front end f' of the respective braking and clutching elements 2' so as to cause them to frictionally engage the brake-surface 8' on the main piece 1 and causing the latter to turn with them and the chain-wheel 4. The hub of the wheel will again be turned together with the main piece 1 because it is rigidly connected thereto by means of the oval recess 19 as described. The braking and clutching elements 2' are thickened on their ends to prevent their respective cams 15" from passing thereover during operation, the said elements 2' engaging on the braking surface merely frictionally.

When free-wheel is practiced all clutching elements 2' leave behind them their respective cams 15", the braking and clutching elements 2' will no longer frictionally engage the brake surface, and accordingly the chain-wheel 4 will be entirely disconnected from the central main piece as soon as the said cams 15" will be left behind sufficiently to release their pressure exerted upon the back of the elements 2'.

When the chain-wheel 4 is turned back for braking as indicated by the arrow in Fig. 6 the cams 15" act upon the rear end r' of the braking and clutching elements 2' in the same manner as described in connection with their action on the front end f' during driving operation. Each of the said rear ends is pressed by one of the said cams upon the brake surface 8' until frictional engagement therewith is established. The thickened shape of the rear ends of the braking and clutching elements 2' prevents the cams from passing over the said ends and thus braking is ascertained for any desired period. In the illustrated embodiment according to Figs. 8 to 10, the said braking and clutching elements tilt on their mid portion m' when there is a change from one manner of operating the device to another manner of operation, for instance when there is a change from driving by turning the chain-wheel in a clockwise direction as shown in Fig. 8 to braking by turning the chain-wheel in counter-clockwise direction as shown in Fig. 10 or a change from free-wheel to one of the last-mentioned manners of operation or vice versa. As shown in Figs. 8 and 10 the braking and clutching elements 2' are recessed on their mid portions m' and each embraces a roller 11 which is interposed between the brake-surface and the respective element 2' to constitute a support for the latter when tilting.

When the said element 2' tilts for braking operation, all of the lugs 31 provided on the said elements 2' engage an equal number of the above-mentioned abutments 13' provided on the detent ring 5. Fig. 10 shows the complete provision of abutments on the said detent-ring 5, the said provision being of annular shape. In connection with the embodiment of the invention shown in the said Figs. 8 to 10 the lugs 31 provided on the braking and clutching elements 2' are located beyond the aforesaid annulus when driving or free-wheel is being practiced.

Now, I will describe a third kind of preferred embodiments of the invention in connection with Fig. 11 and in connection with Figs. 12 and 13 respectively. In said embodiments there are again provided a chain-wheel 4 with inwardly arranged cams and a central main piece 1 provided with a brake-surface 8 and with means for connection to the hub of the wheel and with means for holding in position all parts of the device just as has been described in connection with the afore-mentioned embodiments of the invention. The braking and clutching elements 2" or 2''' respectively again are adapted to tilt on their respective brake surface, in connection with these embodiments of the invention the said elements 2" or 2''' however are immediately supported on the said brake surface. Moreover the cams 15''' provided on the chain wheel and adapted to cooperate with the outer side of the braking and clutching elements 2" or 2''' in a manner similar to that described in connection with Figs. 8 to 10 are recessed to embrace a roller 7' provided to transfer the pressure from the respective cam to the adjacent braking and clutching element 2'' or 2'''. As shown in Fig. 11 and in Figs. 12 and 13 there are provided on the central main piece 1 recesses 22 for obtaining an easy engagement on the said main piece, when the front ends *f''* or *f'''* of the aforesaid clutching elements 2'' or 2''' are lowered to engage said main piece.

In connection with the embodiment shown in Fig. 11 there is provided on the front end *f''* of each of the aforesaid elements 2'' a spring actuated latch 23, 24, while on the rear end *r''* of each of the same elements a lug 31 is provided just as described in connection with Figs. 8 to 10.

When the chain wheel 4 is turned in a clockwise direction to drive the vehicle, the front end *f''* of each member 2'' is lowered towards the brake surface as described in connection with the embodiment of the invention shown in Figs. 8 to 10. In the present instance however the pressure operating the members 2'' in the said manner is transferred upon the said members by means of the rollers 7' embraced by the cams 15''' recessed accordingly. When the front ends of the tilting members 2'' are lowered in the said manner to engage the brake-surface 8 each of the latches 24 provided thereon engages one of the recesses 22 provided on the central main piece in addition to the braking surface 8 thus connecting forcibly and frictionally at one time the chain-wheel 4 to the central main piece 1 which is rigidly connected to the hub of the wheel of the vehicle.

When free-wheel is practiced the braking and clutching elements 2'' leave behind them their controlling cams 15''' and the springs 23 provided on the front end of the said members 2'' in connection with the above-mentioned latch 24 will lift the adjacent end of the respective braking and clutching element until the latter are all in their mid position and thereafter the light latches are removed from their respective recesses by the oblique flanks of the latter, the chain-wheel 4 being thus fully disconnected from the central main piece 1.

When turning back the chain-wheel braking is effected just in the same manner as described above in connection with the embodiment shown in Figs. 8 to 10.

In the embodiment of the invention shown in Figs. 12 and 13 there are provided just as described in connection with Fig. 11 a central main piece 1 comprising recesses 22 in addition to a brake-surface 8, a chain-wheel 4 provided with inwardly arranged cams 15''', the said cams being recessed to embrace a roller 7', braking and clutching members 2''' immediately supported on the said brake-surface 8 and adapted to tilt thereon. An annulus of abutments 13'' is provided on the detent ring (not shown in these figures) which is anchored to the frame of the vehicle in a manner as shown in Fig. 10. The diameter of said annulus of abutments 13'' provided on the present embodiment of the invention however is larger than that of the respective annulus shown in Fig. 10 and on the tilting members 2''' one lug 31' is provided on the front end *f''* of each of them while on the rear ends *r'''* of the said elements 2''' helical springs 21 are arranged, said springs resting in holes provided in the rear end *r'''* of each member 2''' and abutting on the inner wall of the chain-wheel 4. The said lugs 31' are adapted to engage the recesses 22 provided on the central main-piece 1 as described, and are fit as well to engage the said abutments 13'' on the detent-ring 5; the said lugs 31' are situated within the annulus constituted by the aforesaid abutments 13'', when driving or free-wheel is practiced as will be described hereafter.

When in connection with the embodiment of the invention shown in Figs. 12 and 13 the chain-wheel 4 is turned in a clockwise direction for driving, the rigid lugs 31' provided on the front end *f'''* of the braking and clutching members 2''' engage each one of the recesses 22 provided on the central main piece to connect the same forcibly and frictionally to the chain-wheel 4, in each other respect the operation being just the same as described above in connection with Fig. 11.

When free-wheel is practiced the operation is again very much similar to that described in connection with Fig. 11. It is the rigid lugs 31' in the present instance which are shifted out off the recess 22 by the oblique flanks of the same, the said operation being sustained in this case by the pressure of the springs 21 provided on the rear end *r'''* of each member 2'''. All other operations which take place in connection with free-wheel will be the same as indicated with reference to the embodiment of the invention shown in Fig. 11.

When the chain-wheel 24 is turned in a counterclockwise direction for braking as indicated by the arrow in Fig. 13 the rear end of each element 2''' is lowered towards the brake-surface under the influence of the respective cams 15''' acting on the said elements 2''' by means of the rollers 7' as described. At the same time the front ends *f'''* of the said elements 2''' provided with the abovesaid rigid lugs 31' are raised towards the chain-wheel 4, in connection herewith all the said lugs 31' engage an equal number of the above mentioned abutments 13'' provided on the detent-ring 5, the braking action being then the same as described with reference to the embodiments of the invention shown in Figs. 8 to 10 and in Fig. 11 respectively.

In connection with the last described embodiments of the invention shown in Fig. 11 and in Figs. 12 and 13 respectively a resilient steel ring (not shown) can be arranged for supporting the braking and clutching elements 2'' or 2''' in a manner similar to that shown in Figs. 1, 2, 4 and 6 in connection with the respective embodiment of the invention and supporting the braking elements 2 as described. The said resilient steel-ring (not shown) tends to push away from the brake-surface 8 those portions of the aforesaid braking and clutching elements 2'' or 2''' which are not acted upon by their respective cam 15.

It will be understood that the detent-ring 5 does not constitute an absolutely necessary means and that changes and modifications may be made without departing from the invention, for instance referring to the embodiment shown in Figs. 8 to 10 which depends merely on friction, the said detent ring can be eliminated.

While I have shown and described and pointed out the fundamental novel features of the invention, it will be understood that various changes and modifications and substitutions may be made by those skilled in the art without departing from the spirit of the invention.

I claim:

1. Free-wheel mechanism with back pedalling brake, comprising a driving wheel and a driven wheel, a braking surface on said driven wheel, independent braking and clutching means freely mounted between said driving wheel and said braking surface, and control cams provided on said driving wheel itself and acting directly upon said braking or clutching means and adapted to act either upon said clutching means to produce a driving connection between the driving wheel and the driven wheel or upon said braking means to produce a braking action, any and all controlling cams for producing either one of said actions being provided on the driving wheel itself.

2. In a mechanism as specified in claim 1, a braking drum having a cylindrical boring fitting on the hub, said boring being smooth and continuing at one end into an oval recess adapted to receive an accordingly shaped portion of the hub.

3. In a free-wheel mechanism with back pedalling brake, a braking drum connected to a driven wheel, a resilient steel ring surrounding said drum, a braking ring composed of a plurality of sections, said braking ring being adapted to act upon said braking drum and being urged away from the same by said steel ring, a driven chain-wheel, curved controlling cams on said chain-wheel, pressure transferring means inserted between said controlling cams and said braking ring and extending beyond the circumference of said braking ring, said cams exerting pressure upon said pressure transferring means upon back movement of the chain wheel, axially movable clutching means including a clutch ring adapted to engage a latch ring on said braking drum, and means between the chain-wheel and the clutch ring for controlling the axial clutching movement of the latter.

4. In a free-wheel mechanism with back pedalling brake, a braking drum connected to a driven wheel, a resilient steel ring surrounding said drum, a braking ring composed of a plurality of sections, said braking ring being adapted to act upon said braking drum and being urged away from the same by said steel ring, a driven chain-wheel, curved controlling cams on said chain-wheel, pressure transferring means loosely inserted between said controlling cams and said braking ring, said cams exerting pressure upon said pressure transferring means upon back movement of the chain-wheel, axially movable clutching means including a clutch ring adapted to engage a latch ring on said braking drum, and means between the chain-wheel and the clutch ring for controlling the axial clutching movement of the latter.

5. In a free-wheel mechanism with back pedalling brake, a driving wheel, a braking drum connected to a driven wheel, controlling cams on said driving wheel, means tiltably resting upon the braking drum and being under the control of said controlling cams, said means being adapted to frictionally engage the braking drum on opposite portions of the tilting point, said engagement being determined by the position of said cams relatively to the tilting point, said tiltable means being loosely arranged between said driving wheel and said braking drum.

6. A mechanism as specified in claim 5 wherein the movement of the cams on the driving wheel in either direction relatively to the tilting point of said tiltable means is limited by said means themselves.

7. A mechanism as specified in claim 5 wherein said tiltable means rest upon rolling means serving as tilting axis, said rollers resting in turn upon said braking drum.

8. A mechanism as specified in claim 5 wherein said tiltable means are resting immediately upon said braking drum and are adapted to rock about a portion of said drum when tilting.

9. A mechanism as specified in claim 1 wherein the braking and clutching means include latching means for maintaining driving or braking connection between the driving wheel and the driven wheel.

10. In a mechanism as specified in claim 1 wherein the braking and clutching means include latching means for maintaining driving or braking connection between the driving wheel and the driven wheel, said latching means comprising abutments on a detent-ring adapted to coact with abutments on said braking and clutching means.

11. In a free-wheel mechanism with back pedalling brake as specified in claim 1 wherein said braking surface is provided on a braking drum, said braking drum having notches and a set of projections on said braking and clutching means, said projections being adapted to coact with said notches on the braking drum.

12. In a free-wheel mechanism with back pedalling brake as specified in claim 1 wherein said braking surface is provided on a braking drum, a detent-ring anchored to the frame of the vehicle, said detent-ring having notches and said braking drum having also notches and a common set of projections on said braking and clutching means, said projections being adapted to coact with said notches on said detent-ring as well as with said notches on the braking drum.

13. A device as specified in claim 1 wherein said controlling cams are acting upon the means being under the control of said cams by means of curved guide means so shaped to secure a reliable engagement on the parts in the operative positions, the guiding curves of said guide means extending beyond the point of operative engagement for an amount entire wearing out of which is practically impossible with respect to the friction occurring.

14. In a device as specified in claim 1 wherein said controlling cams are acting upon the means being under the control of said cams by means of curved guide means so shaped to secure a reliable engagement of the parts in the operative positions, the guiding curves of said guide means running at the point of operative engagement at a right angle to the direction of the acting force.

15. In a mechanism as specified in claim 4 wherein the clutch ring includes a curved guide path adapted to receive controlling cams provided on the chain-wheel for controlling the lateral clutching movement of said clutch ring.

16. In a free-wheel mechanism with back pedalling brake as specified in claim 1 wherein rolling means are provided between said controlling cams on the driving wheel itself and said braking and clutching means.

17. In a free-wheel mechanism with back pedalling brake as specified in claim 1 wherein rolling means are provided between said controlling cams and said braking and clutching means, said rolling means being enclosed in a cage-like manner by said controlling cams.

18. A mechanism as specified in claim 4 wherein said pressure transferring means comprise rollers, located within cage-like recesses of said clutch ring.

ERICH MÜLLER.